(12) United States Patent
Sela et al.

(10) Patent No.: US 11,161,531 B2
(45) Date of Patent: Nov. 2, 2021

(54) RAIL TESTING SYSTEM

(71) Applicant: ScanMaster systems (IRT) Ltd., Kfar Saba (IL)

(72) Inventors: Ofer Sela, Haifa (IL); Avner De-Swann, Ramat HaSharon (IL); Michael Bron, Petach Tikva (IL)

(73) Assignee: ScanMaster systems (IRT) Ltd., Kfar Saba (IL)

( * ) Notice: Subject to any disclaimer, the term of this patent is extended or adjusted under 35 U.S.C. 154(b) by 0 days.

(21) Appl. No.: 15/739,807

(22) PCT Filed: Jun. 19, 2016

(86) PCT No.: PCT/IL2016/050652
§ 371 (c)(1),
(2) Date: Dec. 26, 2017

(87) PCT Pub. No.: WO2016/207880
PCT Pub. Date: Dec. 29, 2016

(65) Prior Publication Data
US 2018/0162425 A1    Jun. 14, 2018

Related U.S. Application Data

(60) Provisional application No. 62/182,226, filed on Jun. 19, 2015.

(51) Int. Cl.
*B61K 9/10* (2006.01)
*G01N 29/04* (2006.01)
(Continued)

(52) U.S. Cl.
CPC ............... *B61K 9/10* (2013.01); *G01N 29/04* (2013.01); *G01N 29/043* (2013.01); *G01N 29/06* (2013.01);
(Continued)

(58) Field of Classification Search
CPC ........ B61K 9/10; G01N 29/04; G01N 29/043; G01N 29/06; G01N 29/069
(Continued)

(56) References Cited

U.S. PATENT DOCUMENTS

| 3,028,753 A * | 4/1962 | Joy .................... B61K 9/10 73/636 |
| 2006/0065055 A1* | 3/2006 | Barshinger ............ B61K 9/10 73/609 |
| 2009/0146680 A1* | 6/2009 | Moser .................... G01R 31/34 324/765.01 |

FOREIGN PATENT DOCUMENTS

FR    2635066    2/1990

* cited by examiner

*Primary Examiner* — Tarun Sinha
(74) *Attorney, Agent, or Firm* — The Roy Gross Law Firm, LLC; Roy Gross

(57) ABSTRACT

An ultrasonic inspection apparatus for an ultrasonic inspection system for inspecting a railway track, the ultrasonic inspection system for attaching to a bogie for pulling over the railway track, comprising a framework for attaching to the bogie, a sled for inspecting a rail, the sled carrying an array of ultrasonic transducers for detecting flaws in the rail, the system further comprising a water subsystem for ensuring fluid coupling between the sled and the rail, automatic lateral position rectification subsystem for keeping the sleds centered over the railway tracks as the train moves along the track, the ultrasonic transducers in data communication with a computing system in a wagon over the bogie for analyzing and mapping the flaws in the rail, wherein at least one pair of ultrasonic transducers is mounted in the same housing thereby shortening the length of the sled to be irrigated.

20 Claims, 4 Drawing Sheets

(51) Int. Cl.
*G01N 29/06* (2006.01)
*G01N 29/265* (2006.01)
*G01N 29/28* (2006.01)
*G01N 29/22* (2006.01)

(52) U.S. Cl.
CPC .......... *G01N 29/069* (2013.01); *G01N 29/22* (2013.01); *G01N 29/225* (2013.01); *G01N 29/265* (2013.01); *G01N 29/28* (2013.01); *G01N 2291/044* (2013.01); *G01N 2291/106* (2013.01); *G01N 2291/2623* (2013.01)

(58) Field of Classification Search
USPC .......................................................... 73/636
See application file for complete search history.

RAIL TESTING SYSTEM

BACKGROUND

Defects or flaws in rails are a source of concern in the railways industry. Such flaws may be an artifact of the manufacturing processes or they may subsequently develop during use through fatigue processes and the like. Depending on their size and their location within the rail profile, a flaw may be categorized as critical or as non-critical.

A railway track with flaws may be used by trains carrying passengers and freight as long as the sizes of all flaws in the rails remain below a critical size. However, as non-critical flaws may grow in time into critical defects, and as new flaws may appear over time, the inspection of railway tracks for defects should be performed periodically, and where necessary, detected flaws should be repaired or sections of the railway track should be replaced.

To detect flaws in the rails, different nondestructive inspection methods are deployed. One popular technique is ultrasonic testing. A wagon carrying appropriate rail inspection apparatus travels along the track whilst an ultrasonic transducer is kept in sonic contact with the upper surface of the rail. Ultrasonic signals are reflected by the track and defects detected are analyzed and characterized. Such an apparatus can continuously perform ultrasonic inspection of the rails as the wagon passes over them.

U.S. Pat. No. 4,044,594 discloses a rail testing device by means of only one transducer located in a wheel, which necessitates a complex regulating system to correct the lateral and angular variations of the wheel resulting from irregularities of the rail surface. Reliable usage of such devices requires relatively low travelling speeds.

Other solutions use a sled or shoe that slides along the rail. In an inspection apparatus of the sled type, ultrasonic transducers are mounted in transducers housings that are carried on a sled that slides along the rail. Typically two such sleds are employed, one on each rail. For example, published European patent application No. 0 16 591 describes a method and device for testing a rail by a means of ultrasonic transducers sliding on the rail while maintaining sonic contact using a coupling fluid that is typically water. The intensity of the signal received by at least one of the transducers reflects the intensity variations of the ultrasonic beam reflected by the lower surface of the sole of the rail.

It will be appreciated that the geometric position of the track is never perfect and defective alignment can cause misinterpretation of the signals. The discontinuities between sections of rails cause the sled to swing or jump and acoustic connection is lost. The higher the speed of the train, the more serious the perturbation and this limits the speed at which ultrasonic testing may be accomplished. Installations such as points can subject the transducers to high forces and have even been known to detach the transducer from the measuring wagon.

To fully characterize a rail, several ultrasonic transducers are required. When arranged in a line along a 'shoe' or 'sled', the length of the shoe or sled is considerable. This makes it impossible to ensure ultrasonic contact at speed and adversely affects the speed of the measurement.

Attempts to overcome these problems include having the transducers sprung mounted in sockets into which they can retract as they hit obstacles.

U.S. Pat. No. 4,235,112 describes a sled that includes a laterally movable ultrasonic transducer comprising the sensor of a rail fault detection transducer wherein the sensor is automatically centered in response to differences in the ultrasound echoes received by transducers fore and aft of the sensor.

Unfortunately, since in addition to off-centering, the state of corrosion of the lower surface or sole of the foot of the rail and defects in the web of the rail affect the echo signal, it is not always easy to determine the root cause.

The need to center the transducer on the rail, despite the fact that the rails themselves curve as the track winds its way over terrain to reduce gradients and to avoid topographical features remained a challenge.

Additional such systems and methods that relate to centering systems are described in the prior art. See for example, AU621939 titled "Method and Device for Positioning Transversing Direction of Member Moving Along Railroad Rail". U.S. Pat. No. 5,020,371 titled "Device for the Precise Transverse Positioning for a Member Displaceable Along a Rail of a Railway Track With Respect to Said Rail" which uses ultrasonic signals bounced off the fishplates supporting the rails to determine the traverse displacement of the sled and servometers to correct. This approach somewhat slows the train down.

U.S. Pat. No. 5,522,265 titled "Travelling Ultrasound Fault Detector for Railway Line Internal Faults", describes sprung loaded sensors and the water system for keeping the sensor heads and the rail coupled with a film of water. The improved version described with reference to FIGS. 4 and 5 thereof, supplies water at a pressure of between 10 and 15 bars.

U.S. Pat. No. 5,574,224 titled "A Process and a Device for the Continuous Nondestructive Control of Rails on a Railway Line by Ultrasonics".

U.S. Pat. No. 5,804,731 to Jaeggi, titled "Ultrasonic device for Measuring the Internal Defects of a Rail" describes a continuous web of acoustic conducting material that surrounds the ultrasonic sensor array like a caterpillar track and protects them from wear.

Scanmaster has developed and patented technology for mapping flaws in work pieces using ultrasound. See for example, U.S. Pat. No. 6,070,466 to Taran et al. V, titled "Device for Ultrasonic Inspection of a Multi-Layer Metal Workpiece."

The ultrasonic waves of such ultrasound systems require a transmission medium or coupling fluid, and, when used for examining railway rails, water is used as the coupling fluid. The large quantity of water consumed as the sled is pulled over the rails has to be carried on board the train, and this affects the ability of the system to inspect rails over long distances with high reliability. The water used up in this manner is not available for thither use and thus there is both an economical and an ecological cost. Furthermore, in some regions, such refilling stations are simply not available.

BRIEF SUMMARY OF THE INVENTION

An aspect of the present invention is directed to providing An ultrasonic inspection apparatus for an ultrasonic inspection system for inspecting a railway track, the ultrasonic inspection system for attaching to a bogie travelling over the railway track, comprising a framework for attaching to the bogie, a sled for inspecting a rail, the sled carrying an array of ultrasonic transducers for detecting flaws in the rail, the system further comprising a water subsystem for ensuring fluid coupling between the sled and the rail, automatic lateral position rectification subsystem for keeping the sleds centered over the railway tracks as the train moves along the track, the ultrasonic transducers in data communication with a computing system in a wagon over the bogie for analyzing and mapping the flaws in the rail, wherein at least one pair of ultrasonic transducers is mounted in the same housing thereby shortening the length of the sled to be irrigated.

Preferably the ultrasonic inspection system further comprises a GPS for mapping the location of each detected flaw.

In some embodiments the automatic lateral position rectification subsystem comprises magnets for aligning the sled with the center of the head of the rail.

Optionally, the automatic lateral position rectification subsystem comprises a magnet at each end of the sled.

Typically, the system comprises a pair of sleds for simultaneously examining a pair of rails of the railway track.

In preferred embodiments, the water supply subsystem is configured to provide sufficient water in use to allow continuous fluid contact between the transducers and the rail, but to minimize water consumption.

In some embodiments the water supply subsystem includes a water tank for storing a reservoir of water, water pumps, a water flow regulator, 4×3 water control valves, an integrate water manifold in the sled, a water filter and a conduit draining system.

Typically, the water tank has a minimum capacity of 2000 liters.

Typically, the water tank is integrated into the wagon.

Optionally, the water tank comprises outlets and inlets of ¾ BSP on both left and right sides, and an opening for water filling.

In some embodiments, the water pumps are membrane type water pumps.

Preferably, the water pumps have automatic pump shutoff when water flow is blocked beyond the pump.

In some embodiments, the sled includes a water chamber and the water subsystem further comprises vacuum pumps for controlling the pressure inside the water chamber to a minimal amount above atmospheric pressure.

Optionally, superfluous pumped water is filtered and recycled back to the tank.

Some embodiments include an advanced water flow regulator that includes internal electromechanical feedback.

Preferably the system further comprises an operator console within the wagon and enables an operator to control water consumption from the operator console within the wagon.

In some embodiments, the water flow subsystem is configured to suck back excess water down track from the sled for reuse.

In some embodiments, the water flow subsystem comprises hydraulic 4×3 control valves for the sucking back of the excess water.

Preferably, water sucked up via the vacuum pumps is filtered through a filter before reentering into the tank.

In some embodiments, the hydraulic 4×3 control valves enable changing water flow direction so that the water provided to the rail is provided in front of the sled and the vacuum suction to recycle excess water is to rear of sled regardless of which direction the wagon travels.

In some embodiments, the hydraulic 4×3 control valves are configured to assume a shutoff mode in a middle position when the wagon is stationary.

In some embodiments, the transducer housing of the sled comprises an internal manifold for ensuring stable wetting of the transducers' contact surface whilst using a minimal pressure above atmospheric pressure.

In some embodiments, the system further comprises a filter provided upstream of the pump for filtering the water before it enters the pump.

Optionally, the system further comprises a conduit drainage system for drying the conduits by forcing compressed air into the conduits to actively drain the conduits.

BRIEF DESCRIPTION OF THE FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

In the drawings, like components are generally designated by like reference numerals, wherein.

A consistent numbering scheme is generally used throughout the Figures and associated text.

DESCRIPTION OF THE EMBODIMENTS

The present invention is directed to an improved system and sled for the ultrasonic examination of the rails of railway tracks. The improved apparatus described herein is part of a comprehensive automatic inspection system that detects flaws in the rail using conventional ultrasonic methodology, identifies the location of the flaw when detected, and records the location of the detected flaws for further analysis, after which the rail will either be approved for further use as is, or repaired or replaced as necessary. Such comprehensive automatic inspection systems are well-known, and are described, for example, in AU621939, U.S. Pat. Nos. 5,020, 371, 5,522,265, 5,574,224 and 6,070,466 to Taran et al.

The improvements include:

A support frame that is attachable to the bogie wheels of any bogie that may be used to support a wagon housing the computers and other systems of the inspection system. The frame is adjustable to bogie wheels of different sizes and separation and to different railway gages.

An improved sled design and water dispensing system to massively decrease the water usage, enabling the train to cover more track between refills, minimizing water loss per km of track and reducing the weight and volume of water carried by the train.

Automatic lateral position rectifiers for keeping the sleds centered over the railway tracks as the train moves along the tracks.

The above advantages, amongst others, are detailed hereinbelow.

The sled is connected between a pair of bogie wheels of an inspection wagon (known in the US as a rail car) which travels along a rail. The connection of the sled to the bogie wheels is accomplished in a flexible way that allows the sled to bed coupled to a wide range of bogie wheels of a rail bound vehicle which is typically some type of rolling stock which serves as the inspection vehicle. The sled does not alter the bogie structure.

The track gauge, i.e. the spacing between the two rails of a railway track varies between countries and may vary between railway tracks in the same country. All such railway tracks need to be monitored for flaws and so bogie mounted sleds are preferably able to be connected to bogies having different gages without major and complicated reconfigurations. In countries with railways of different gages, the same inspection equipment should be easily mountable onto different bogies with different gages. The sled connection should, therefore, be flexible enough to be able to be easily and quickly mounted to bogie wheels of each gage.

Figure 1:
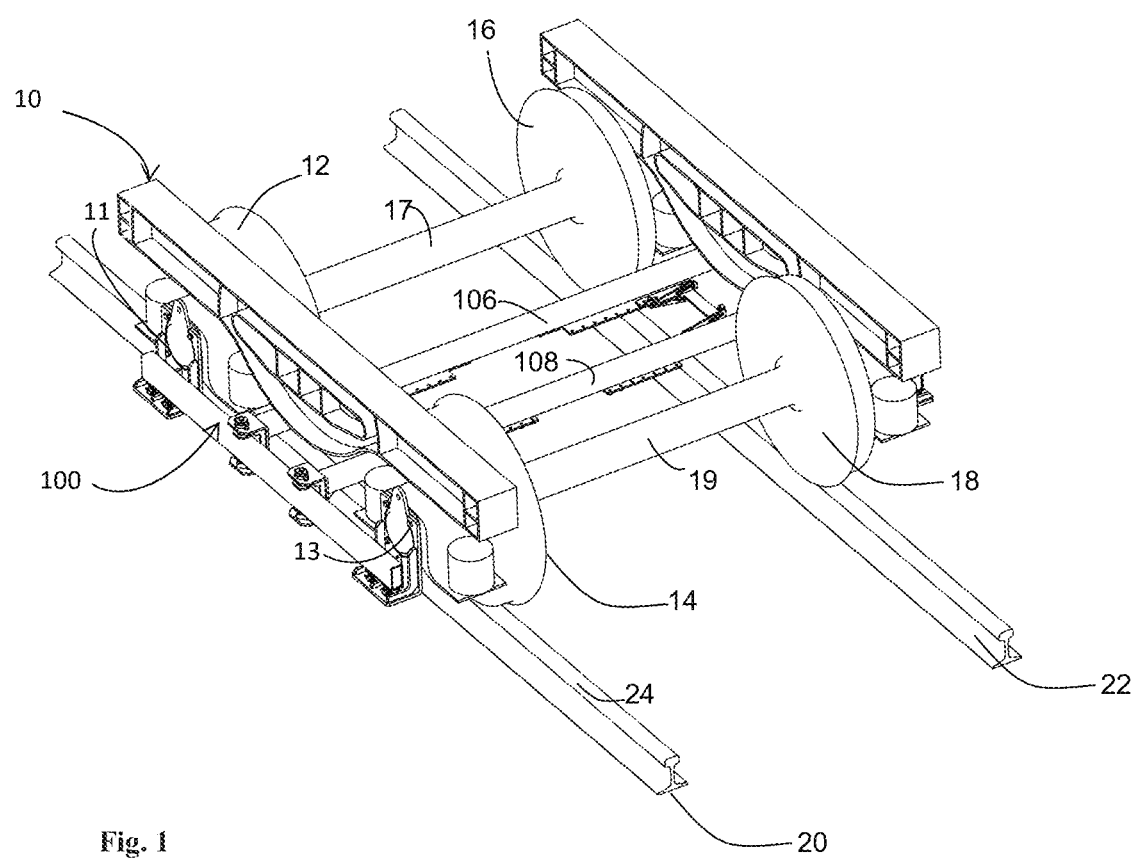
FIG. 1 is a schematic isometric projection of the bogie wheels of a bogie (not shown), with an adjustable framework for supporting the ultrasonic testing apparatus.
Figure 2:
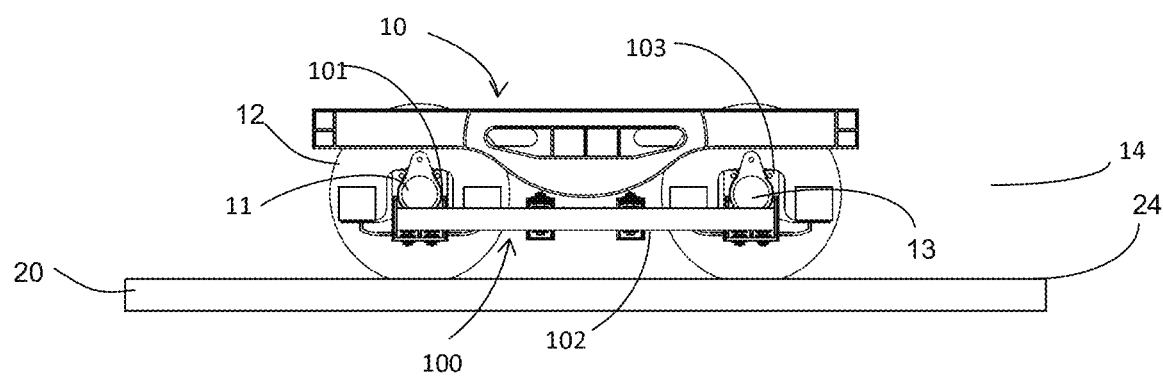
FIG. 2 is a schematic side view of the adjustable framework.

With reference to FIGS. 1 and 2, an adjustable support frame 100 is shown coupled to the bogie axle bearing caps 11, 13 of a bogie 10 in the rails 20, 22 of a railway track. The wagon carried by the bogie 10 is not shown. The term wagon used herein refers to what is commonly referred to in the UK as a bogie wagon, and in the US as a rail car or freight car.

The frame 100 comprises a pair of lengthwise bars 102, 104 that are each designed to span between two adjacent bogie wheels 102, 104 (106, 108). The lengthwise bars 102, 104 of the framework 100 is connected to the wheel bearing covers 11, 13 of the bogie axles 9, 19 by 4×4 bolts. There are two sleds per inspection system, one for the left rail 20 and the other for the right rail 22.

A pair of sockets 101, 103 (105, 107) are adjustably fixed to each lengthwise bar 102 (104). The separation of the sockets 101, 103 (105, 107) may be adjusted by sliding the sockets 101, 103 (105, 107) along the lengthwise bars 102 (104), and in this manner, the lengthwise bars 102 (104) may be correctly adjusted in effective length and thereby sized for different bogie wheels 12, 14 (16, 18) of different diameters and different separations.

Figure 3:
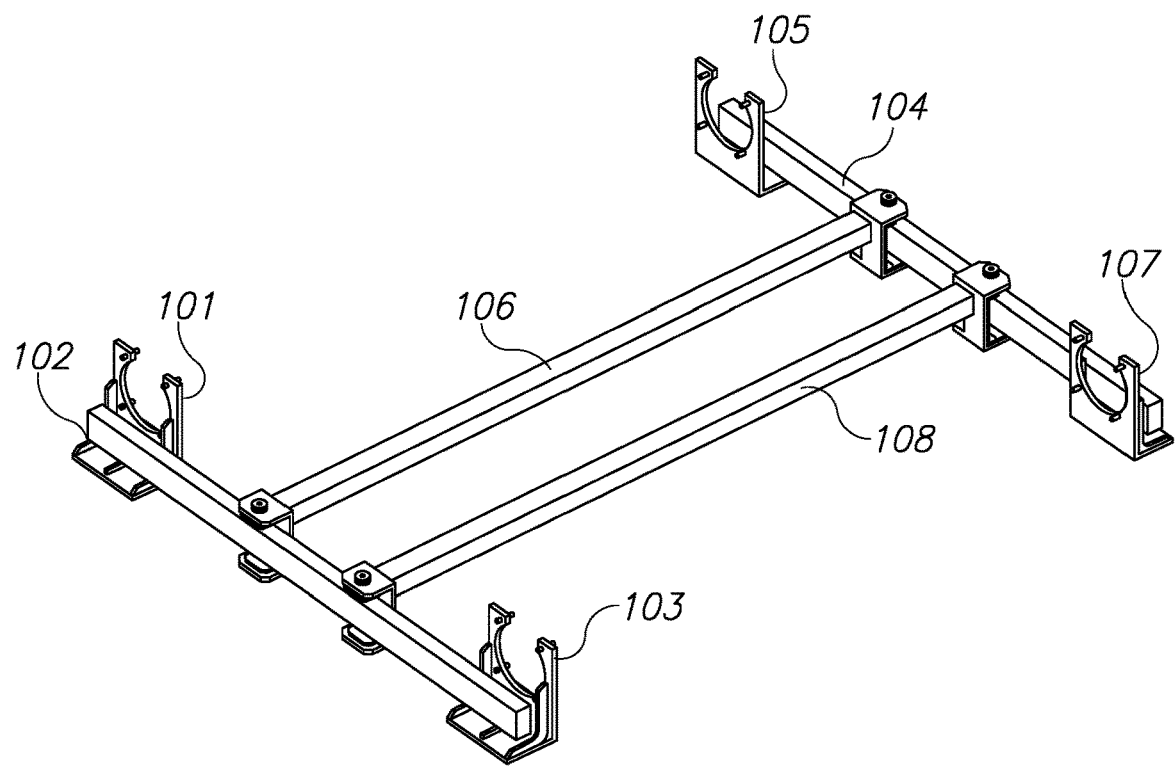
FIG. 3 is a schematic illustration of the adjustable framework without the bogie.

With further reference to FIG. 3, the two lengthwise bars 102 (104) are coupled together by a pair of widthwise separator bars 106, 108. The coupling between the lengthwise bars 102, 104 and the separator bars 106, 108 can be adjusted to fit railway tracks 20-22 of different gages. The entire framework 100 is bolted together and bolted to the bearing caps 11, 13 of the bogie wheels 102, 104, 106, 108. The sleds, described hereinbelow, are bolted to the adjustable support frame 100. The adjustable support frame 100 can be dismantled into separate bars 102, 104, 106, 108 for storage and shipping, and easily and quickly configured to a specific set of bogie wheels 102, 104, 106, 108 and to an appropriate gage. This feature drastically reduces the time required to set up an ultrasonic inspection system for a particular railway line, it being appreciated that even within the same country, there may be different gage railways, each with its own gage.

Figure 4:
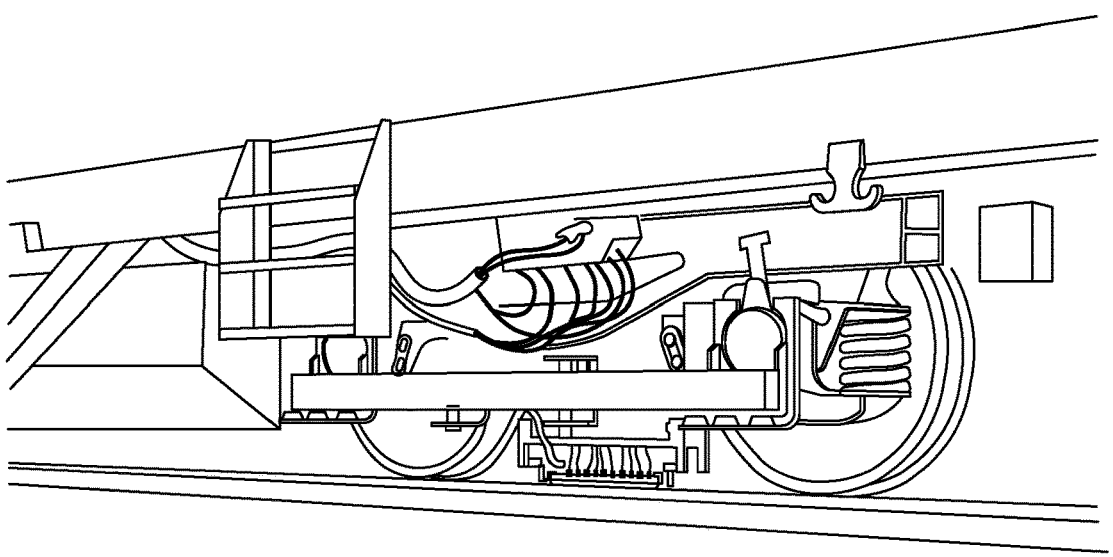
FIG. 4 is a photograph of the bar of the adjustable framework attached between a pair of bogie wheels and showing the sled.

Merely for the sake of illustration, FIG. 4 shows a lengthwise bar 102' of the adjustable framework support in situ, attached by the sockets 101, 103 to the to the wheel bearing covers 11, 13 of the bogie axles (9, 19—FIG. 2) by 4×4 bolts. FIG. 4 also shows a sled 120 of the ultrasonic inspection system attached thereto.

In a system for the examination of railway rails 20, 22 by ultrasound, a sled 120 (122) is used on each rail 20 (22).

Figure 5:
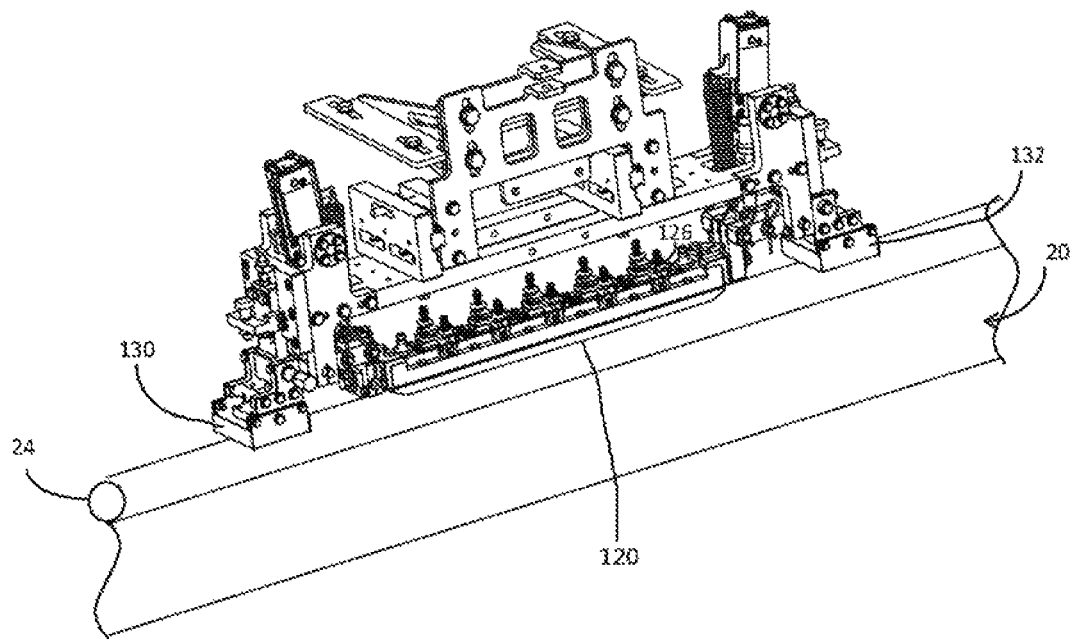
FIG. 5 shows the sled assembly over a rail, not showing the framework or the bogie.

With reference to FIG. 5, such a sled, carrying an array of ultrasonic transducers is shown hovering over a section of track. The sled is kept in fluid contact with the rail by the layer of water providing a dynamic floating regime.

By mounting two transducers in the same housing, the overall length of the transducer array has been significantly reduced. This reduces the length of sled to be kept irrigated with the coupling film of water and further reduces the water requirements.

Figure 6:
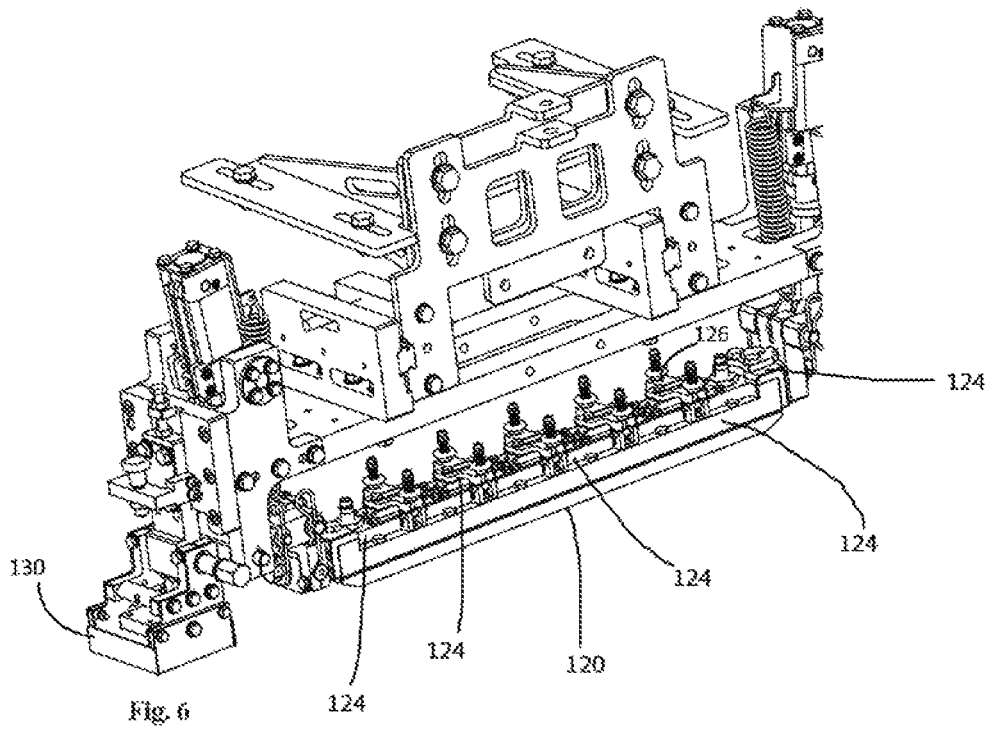
FIG. 6 is a more detailed view of part of an embodiment of the sled, showing the magnets centering device.

Also shown in FIG. 5 and in more detail in FIG. 6, automatic lateral position rectifiers 130, 132 comprising magnets are provided on each side of the sled 120. These serve to keep the sled positioned over the head 24 of the rail 20 despite the winding path of the rails 20, 22.

The sled 120 includes a transducer housing assembly 124 for ultrasonic transducers 126, automatic lateral position rectifiers 130, 132 for keeping the sled 120 centered over the rail 20, and a water system, described hereinbelow, for keeping the sled 120 in contact with the head 24 of the underlying rail 120 by a water film coupling layer that performs as an ultrasonic transmission medium between the transmitting/receiving head of the transducers 126 and the underlying rail 120.

The transducers to be used and their location are determined by the characteristics of the defects to be detected. During the testing it is important that each transducer remains always precisely positioned with respect to the rail under test.

The sled 120 includes a self-centering mechanism that utilizes automatic lateral position rectifiers 130, 132 comprising magnets which may be fixed or electromagnets, that keeps the ultrasonic beam of the zero degree transducer working in a pulse-echo mode, along a beam axis into the head 124 of the underlying rail 120 in the vertical longitudinal median plane of the rail. The rest of the ultrasonic transducer array of the sled follows this position.

In known systems, a large quantity of water is consumed as the sled is pulled over the rails has to be carried on board the train, and this affects the ability of the system to inspect rails 120, 122 over long distances with high reliability.

Figure 7:
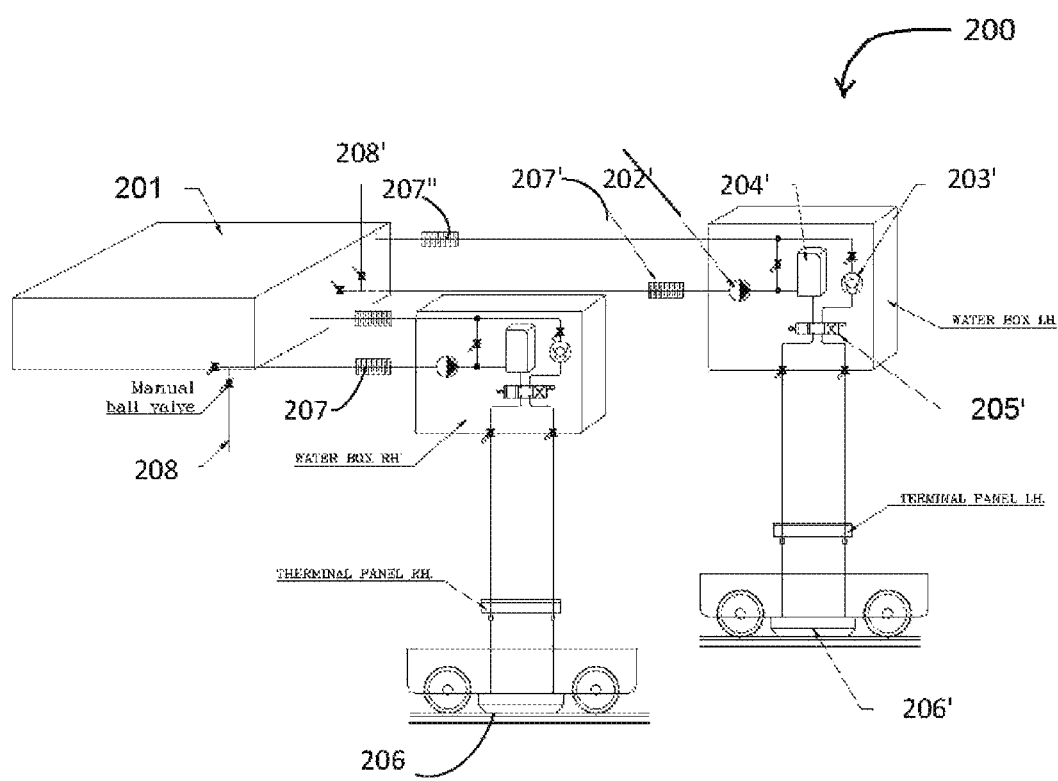
FIG. 7 is a schematic illustration of the water system of a preferred embodiment.

With reference to the schematic illustration of FIG. 7, a particular feature of the ultrasonic inspection system described herein is directed to a water supply subsystem 200 that provides the sufficient water to allow reliable inspection but minimizes water consumption. The water supply subsystem 200 includes a water tank 201 for storing a reservoir of water that serves as a coupling medium between the transducers 106 and the rail head 24. The water supply subsystem 200 also includes water pumps 202, vacuum pumps 203, a water flow regulator 204, 4×3 water control valves 205, an integrated water manifold 206 in the sled 120 (122), a water filter 207 and a conduit draining system 208.

The water supply subsystem 200 is designed to enable sufficient water to be released onto the rails 20, 22 to form a continuous film that serves as a coupling layer between the transducers 126 and the rail head 24, yet maintaining minimal water consumption. For rail inspection, the water tank 201 typically has a capacity of at least 2000 liters and is integrated into the structure of the wagon carried by the bogie 10. The tank 201 includes outlets and inlets openings of ¾ BSP on both left and right sides, and an opening for water filling. The water pumps 202 may be of the membrane type with integrated pump shutoff when the flow is blocked beyond the water pump 202. The vacuum pumps 203 enable the controlling of the pressure inside a water chamber NUM within the sled body 120 (122) so that the pressure will be a minimal amount above the atmospheric pressure to keep good UT (ultrasonic testing) coupling while avoiding unnecessary water leaks. This is a very different solution than the typically 10-15 bar water pressure of the prior art which results in significantly greater water usage. The pumped water from down-track of the sleds 200, 202 is filtered through filters 207', 207" and recycled back to the tank 201.

Advanced water flow regulators 204, 204° that include internal electromechanical feedback are provided in both the left and right rail examination systems. These enables controlling of the water consumption from the operator console to within ±5%.

It is a particular feature of the water supply subsystem 200 that superfluous water behind the sled 120, 122, i.e. down-track, may be sucked back using vacuum pumps 203, 203' and reused. Hydraulic 4×3 control valves are provided for this purpose. The hydraulic 4×3 control valves enable changing the flow direction so that the water provided to the rail 20 will be provided in front of the sled 120 and the vacuum suction to recycle some of the excess water will be in the rear, whichever direction the train is travelling in. The hydraulic 4×3 control valves 202, 203 are configured to assume a shutoff mode in a middle position when the train is not moving.

The internal construction of the transducer housing of the sleds 120, 122 include an internal manifold 206, 206' to ensure stable wetting of the transducers contact surface whilst using a minimal pressure above atmospheric pressure.

A filter 207 is provided upstream of the pump 202, and the water is filtered by the filter 207 before entering into the pump 202. Recycled water sucked up using the vacuum pumps 203 is also filtered before reentering into the tank 201.

A conduit drainage system 208 is provided. This system may include a manual ball valve and enables the drying of the conduits 210 by forcing compressed air into the conduits near the tank 201 outlets to actively drain the system when there is a risk of freezing or when the system is not in use.

Persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. An ultrasonic inspection apparatus for an ultrasonic inspection system for inspecting a railway track, the ultrasonic inspection system for attaching to a bogie for travelling over the railway track, comprising a framework for attaching to the bogie, a sled for inspecting a rail, the sled carrying an array of at least one pair of ultrasonic transducers for detecting flaws in the rail, the ultrasonic inspection system further comprising a water system for ensuring fluid coupling between the sled and the rail, automatic lateral position rectification subsystem comprising at least two permanent magnets spaced apart along said rail for keeping the sleds centered over the railway rails mils- as the train moves along the track, the ultrasonic transducers in data communication with a computing system in a wagon over the bogie for analyzing and mapping the flaws in the rail, wherein said at least one pair of ultrasonic transducers is mounted in parallel across said rail thereby shortening the length of the sled to be irrigated, wherein the water system includes a water tank for storing a reservoir of water, water pumps, a water flow regulator, 4×3 water control valves, an integrate water manifold in the sled, a water filter and a conduit draining system, and wherein the water system is configured to suck back excess water down track from the sled for reuse.

2. The system of claim 1 wherein the automatic lateral position rectification subsystem comprises said two magnets, one at each end of the sled.

3. The system of claim 1 comprising a pair of sleds for simultaneously examining a pair of rails of the railway track.

4. The system of claim 1 wherein the water supply subsystem is configured to provide sufficient water in use to allow continuous fluid contact between the transducers and the rail, but to minimize water consumption.

5. The system of claim 1 wherein the water tank has a minimum capacity of 2000 liters.

6. The system of claim 5 wherein the water tank is integrated into a wagon.

7. The system of claim 5 wherein the water tank comprises outlets and inlets of ¾ BSP on both left and right sides and an opening for water filling.

8. The system of claim 1 wherein the water pumps are membrane type water pumps.

9. The system of claim 1 wherein the water pumps have automatic pump shutoff when water flow is blocked beyond the pump.

10. The system of claim 1 wherein the sled includes a water box and the water system further comprises vacuum pumps for controlling the pressure inside the water box to a minimal amount above atmospheric pressure.

11. The system of claim 10 wherein pumped water is filtered and recycled back to the tank.

12. The system of claim 1 further comprising an advanced water flow regulator that includes internal electromechanical feedback.

13. The system of claim 12 for controlling water consumption from an operator console within the wagon.

14. The system of claim 1 wherein the water system flow comprises hydraulic 4×3 control valves for the sucking back of the excess water.

15. The system of claim 1 wherein water sucked up via the vacuum pumps is filtered through a filter before reentering into the tank.

16. The system of claim 1 wherein the 4×3 water control valves enable changing water flow direction so that the water provided to the rail is provided in front of the sled and the vacuum suction to recycle excess water is to rear of sled regardless of which direction the wagon travels.

17. The system of claim 1 wherein the 4×3 water control valves are configured to assume a shutoff mode in a middle position when the wagon is stationary.

18. The system of claim 1 wherein the transducer housing of the sled comprises an internal manifold for ensuring stable wetting of the transducers contact surface whilst using a minimal pressure above atmospheric pressure.

19. The system of claim 1 further comprises a filter provided upstream of the pump for filtering the water before it enters the pump.

20. The system of claim 1 further comprising a conduit drainage system for drying the conduits by forcing compressed air into the conduits to actively drain the conduits.

* * * * *